(12) United States Patent
Bianco et al.

(10) Patent No.: US 9,871,438 B2
(45) Date of Patent: Jan. 16, 2018

(54) CONTROL DEVICE FOR A PFC CONVERTER AND CORRESPONDING CONTROL METHOD

(71) Applicant: STMICROELECTRONICS S.R.L., Agrate Brianza (IT)

(72) Inventors: Alberto Bianco, Gressan (IT); Giuseppe Scappatura, Aosta (IT)

(73) Assignee: STMICROELECTRONIC S.R.L., Agrate Brianza (IT)

( * ) Notice: Subject to any disclaimer, the term of this patent is extended or adjusted under 35 U.S.C. 154(b) by 0 days.

(21) Appl. No.: 15/476,698

(22) Filed: Mar. 31, 2017

(65) Prior Publication Data
US 2017/0207695 A1    Jul. 20, 2017

Related U.S. Application Data

(63) Continuation of application No. 14/868,104, filed on Sep. 28, 2015, now Pat. No. 9,647,532.

(30) Foreign Application Priority Data

Feb. 5, 2015 (IT) .............. TO2015A0082

(51) Int. Cl.
*H02M 3/156* (2006.01)
*H02M 1/42* (2007.01)
(Continued)

(52) U.S. Cl.
CPC ............. *H02M 1/42* (2013.01); *H02J 7/0052* (2013.01); *H02M 1/083* (2013.01); *H02M 1/36* (2013.01); *H02M 1/44* (2013.01); *H02M 3/04* (2013.01); *H02M 7/04* (2013.01); *H05B 33/0815* (2013.01); *H02J 2007/0059* (2013.01); *H02M 2001/0009* (2013.01)

(58) Field of Classification Search
CPC .... H02M 1/42; H02M 1/4208; H02M 1/4225; H02M 3/156; Y02B 70/12; Y02B 70/126; G05F 1/70
See application file for complete search history.

(56) References Cited

U.S. PATENT DOCUMENTS

| | | | |
|---|---|---|---|
| 5,982,156 A | 11/1999 | Weimer et al. | |
| 7,397,678 B2 | 7/2008 | Frank et al. | |

(Continued)

FOREIGN PATENT DOCUMENTS

| | | |
|---|---|---|
| GB | 2502992 A | 12/2013 |
| WO | 2010/082172 A1 | 7/2010 |

*Primary Examiner* — Gary L Laxton
(74) *Attorney, Agent, or Firm* — Seed IP Law Group LLP

(57) ABSTRACT

A control device for a converter of the switched-mode type provided with an inductor element and a switch element generates a driving signal for controlling switching of the switch element and determining alternately a phase of storage of energy in the inductor element as a function of an input quantity and a phase of transfer of the energy stored in the inductor element to an output element on which an output quantity is present; the control device generates the driving signal by means of a control based on the value of the output quantity in order to regulate the same output quantity. In particular, an estimation block determines an estimated value of the output quantity, and a driving block generates the driving signal as a function of said estimated value.

20 Claims, 4 Drawing Sheets

(51) Int. Cl.

| | | |
|---|---|---|
| *H02M 1/36* | (2007.01) | |
| *H02M 1/08* | (2006.01) | |
| *H05B 33/08* | (2006.01) | |
| *H02J 7/00* | (2006.01) | |
| *H02M 1/44* | (2007.01) | |
| *H02M 7/04* | (2006.01) | |
| *H02M 3/04* | (2006.01) | |
| *G05F 1/70* | (2006.01) | |
| *H02M 1/00* | (2006.01) | |

(56) References Cited

U.S. PATENT DOCUMENTS

| | | | |
|---|---|---|---|
| 8,618,747 B2 | 12/2013 | Park et al. | |
| 8,803,489 B2 | 8/2014 | Li et al. | |
| 9,350,237 B2* | 5/2016 | Wang | H03K 17/284 |
| 2008/0252268 A1* | 10/2008 | Feldtkeller | G05F 1/70 |
| | | | 323/207 |
| 2013/0249504 A1* | 9/2013 | Hsu | H02M 1/4225 |
| | | | 323/207 |
| 2014/0266081 A1* | 9/2014 | Garcia | G05F 1/70 |
| | | | 323/205 |
| 2015/0002109 A1 | 1/2015 | Bianco | |

\* cited by examiner

CONTROL DEVICE FOR A PFC CONVERTER AND CORRESPONDING CONTROL METHOD

BACKGROUND

Technical Field

The present disclosure relates to a control device for a power converter, in particular a converter for power factor correction (PFC) and further relates to a corresponding control method.

Description of the Related Art

Switched-mode power supplies are known, which are designed to convert a quantity received at an input, for example an AC voltage from the electrical mains supply, into a regulated output quantity, for example a DC voltage, for supplying an electrical load, for instance a group of LEDs.

These power supplies must generally satisfy stringent requirements as regards the corresponding electrical performance; for example, they must guarantee a high quality factor and a substantially unitary power factor.

For this reason, it is generally envisaged to use, in an input stage of the power supply, a power converter of the so-called power-factor-correction (PFC) type, controlled by a purposely provided control device for regulating the power factor during absorption from the electrical mains supply.

By way of example, FIG. 1 shows the circuit diagram of a PFC converter of a boost type, designated as a whole by 1, controlled by a corresponding control device, designated by 2 (it is emphasized, however, that what follows may be applied to different types of converters, for example of a flyback or buck-boost type).

The control device 2 is provided as an integrated circuit, and has a package and corresponding input and output pins; the integrated circuit may be mounted on a same printed-circuit board (PCB) with the circuit components of the PFC converter 1.

In particular, the PFC converter 1 has, in this configuration: an input terminal IN, present on which is a DC input voltage $V_{in}$, that is generated by a rectifier stage (not illustrated herein) starting from an AC supply voltage $V_{AC}$, for example supplied by the electrical mains supply; and an output terminal OUT, connected to which is a charge-storage element 4, in particular a capacitor, present on which is an output voltage $V_{out}$, for example a DC voltage, having a value greater than the input voltage $V_{in}$ and regulated at a desired value (for example, 400 V).

The PFC converter 1 comprises: an inductor 5, connected between the input terminal IN and a first internal node $N_1$; a switch element 6, in particular a MOSFET, connected between the first internal node $N_1$ and a second internal node $N_2$; a sensing resistor 7, connected between the second internal node $N_2$ and a ground reference terminal (GND); and a diode element 8, having its anode connected to the first internal node $N_1$ and its cathode connected to the output terminal OUT.

The switch element 6 has a first current-conduction terminal, in particular the drain terminal of the respective MOSFET, connected to the first internal node $N_1$, a second current-conduction terminal, in particular the source terminal of the respective MOSFET, connected to the second internal node $N_2$, and a control terminal that coincides with the gate terminal of the respective MOSFET.

On the second internal node $N_2$ a control voltage $V_{CS}$ is further acquired, which is a function of the current that flows in the inductor 5, in given operating conditions.

The PFC converter 1 further comprises an auxiliary winding 9, which is magnetically coupled to the inductor 5 and on which a control voltage $V_{ZCD}$ is present.

The control device 2 has: an input pin 2a, which is designed to receive a control voltage $V_{c\_in}$ indicative of the input voltage $V_{in}$, from a resistive divider 10a, connected to the input terminal IN and formed by a first voltage-dividing resistor and by a second voltage-dividing resistor, which define between them a feedback node on which the control voltage $V_{c\_in}$ is present; an input pin 2b, which is designed to receive a second control voltage $V_{c\_out}$ indicative of the output voltage $V_{out}$, from a resistive divider 10b, which is connected to the output terminal OUT and is formed by a respective first voltage-dividing resistor and second voltage-dividing resistor, defining between them a respective feedback node on which the second control voltage $V_{c\_out}$ is present; an input pin 2c, which is designed to be connected to the auxiliary winding 9 and to receive the control voltage $V_{ZCD}$, which is a function of the voltage across the auxiliary winding 9; an input pin 2d, which is designed to be connected to the second internal node $N_2$ and to receive the control voltage $V_{CS}$, which is a function of the voltage across the sensing resistor 7; and an output pin 2e, which is designed to be connected to the control terminal of the switch element 6 and to supply a driving voltage $V_{GD}$ for controlling switching of the switch element 6 in pulse-width modulation (PWM).

In particular, the control device 2 may be configured to control operation of the PFC converter 1 in the so-called transition mode (which is also defined as "critical conduction" or "boundary conduction" mode).

At each switching cycle, the control device 2 controls closing of the switch element 6 during an ON interval $T_{on}$ (ON interval of the duty cycle), during which the current coming from the supply circulates in the inductor 5 and in the switch element 6 towards ground, determining storage of energy in the same inductor 5.

The duration of the ON interval $T_{on}$ is determined by the control device 2 through a purposely provided feedback-control loop based on the value of the output voltage $V_{out}$, in particular on the value of the control voltage $V_{c\_out}$ indicative of the output voltage $V_{out}$, which is compared to an appropriate reference voltage. In a way not described in detail, the control loop may also be based upon a peak-current control.

Next, the control device 2 controls opening of the switch element 6 during an OFF interval $T_{off}$ (OFF interval of the duty cycle), during which the energy previously stored in the inductor 5 is transferred to the load and to the charge-storage element 4.

In particular, upon completion of the energy transfer, the current in the inductor 5 is zero. The voltage at the first internal node $N_1$, designated hereinafter as "phase voltage $V_{ph}$", comes to satisfy a resonance condition around the value of the input voltage $V_{in}$ on account of the capacitance present on the first internal node $N_1$, mainly due to the parasitic capacitance on the drain terminal of the MOSFET of the switch element 6 and to the parasitic capacitance of the diode element 8 (being in an off condition).

This resonance phase terminates (once again giving rise to the energy-storage phase) when the voltage on the first internal node $N_1$ reaches a lower threshold equal to $2 \cdot V_{in} - V_{out}$, or equal to 0 in the case where this expression yields a value lower than 0.

If the switch element 6 is closed (and the corresponding MOSFET turned on), at this instant, i.e., at the minimum of the resonant oscillation present on the drain voltage of the corresponding MOSFET, when energy transfer is completed, the converter operates in a switching condition at zero current and voltage, enabling a high efficiency. This control is defined as "zero-current detection" (ZCD).

Zero-current detection, and thus determination of the duration of the OFF interval $T_{off}$, are carried out by the control device 2 on the basis of the control voltage $V_{ZCD}$, which is in turn a function of the voltage across the auxiliary winding 9. The control voltage $V_{ZCD}$ thus is indicative of the zero-current (and zero-voltage) condition in the inductor 5.

In particular, the instant when the value of the control voltage $V_{ZCD}$ goes to zero during resonance, which corresponds to the instant when the phase voltage $V_{ph}$ on the first internal node $N_1$ is equal to the input voltage $V_{in}$, is determined.

Even though the solution described makes it possible to obtain as a whole a good control performance, the present Applicant has found that it also has some drawbacks.

In particular, as indicated previously, controlling switching of the switch element 6 requires detection of the output voltage $V_{out}$ by the resistive divider 10b, which involves, however, a considerable power consumption.

The resistance of the resistors used in the resistive divider is indeed high in order to minimize current leakages; for example, it is of the order of tens of MΩ. Considering a value of 400 V for the output voltage $V_{out}$, the resistors thus entail a power consumption of approximately 16 mW. Considering further that the entire power converter may have a target power consumption not higher than 60 mW, the consumption associated to the resistive divider 10b amounts to 25% of the total power consumption.

Furthermore, it is clear that a specific pin 2b is required in the control device 2 for reading the value of the output voltage $V_{out}$, with a consequent increase of the dimensions of the package and of the manufacturing costs.

BRIEF SUMMARY

The aim of the present disclosure is to solve at least some of the problems highlighted previously.

According to the present disclosure, a control device for a converter, a corresponding converter, and a corresponding control method are consequently provided, as defined in the annexed claims.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

As will be discussed in detail, one aspect of the present solution envisages that the control device of the converter is configured to estimate the value of the output voltage $V_{out}$, thus avoiding the use of a resistive divider dedicated to detection of the output voltage $V_{out}$ and of an associated input pin in the same control device.

In particular, the value of the output voltage $V_{out}$ is estimated as a function of the input voltage $V_{in}$ and of the duty cycle D of the PFC converter (the duty cycle D being indicative, in a known way, of the ratio between the ON interval $T_{on}$ and the OFF interval $T_{off}$ in the switching cycle of the switch element of the PFC converter).

For example, in the case previously described of a PFC converter of a boost type, for the aforesaid estimation the following known relation, which links the output voltage $V_{out}$ to the input voltage $V_{in}$ is applied:

$$V_{out} = \frac{V_{in}}{1-D}$$

or likewise:

$$V_{out} = \frac{V_{in}}{T_{off}} \cdot T$$

where T is the switching period.

The expression that links the output voltage $V_{out}$ to the input voltage $V_{in}$ as a function of the duty cycle D may differ in the case of a different topology of PFC converter (in a known way, not described in detail herein).

Figure 2:
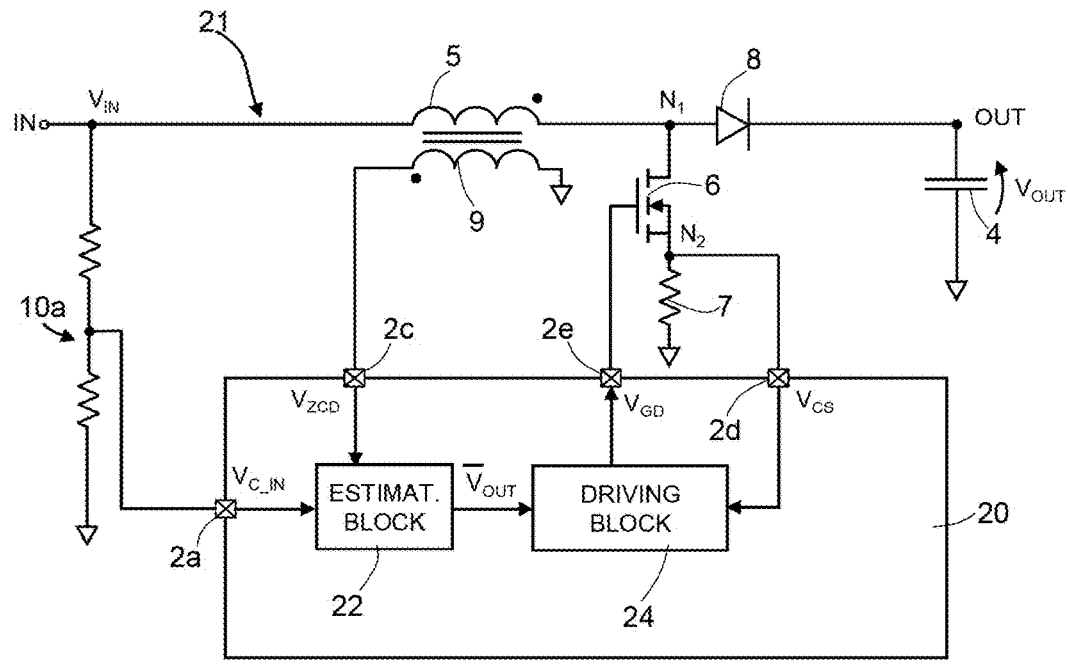
FIG. 2 shows a schematic circuit diagram of a PFC converter and of a corresponding control device, according to one embodiment of the present solution.

In detail, FIG. 2 shows a control device, here designated by 20, for a PFC converter, for example of a boost type, designated by 21.

Figure 1:
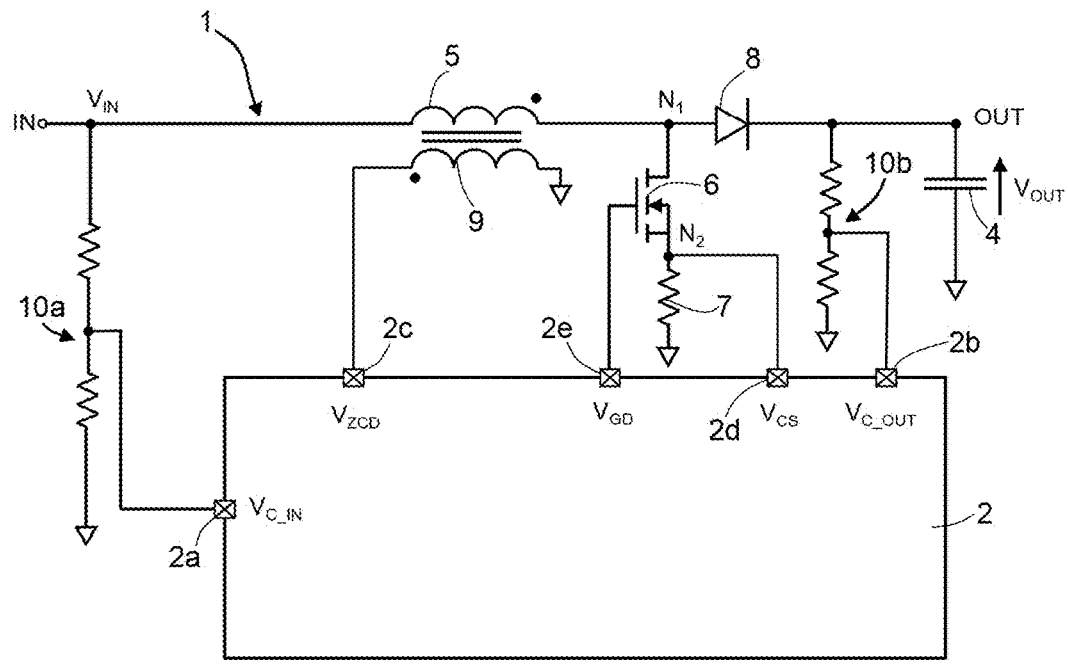
FIG. 1 shows a schematic circuit diagram of a PFC converter and of a corresponding control device, of a known type.

The PFC converter 21 substantially corresponds to the PFC converter 1 described in FIG. 1, to which reference is made (corresponding elements are designated by the same reference numbers), except for the absence of a resistive divider connected to the output terminal Out.

The control device 20 is provided, in a way similar to what has been described with reference to the aforesaid FIG. 1, with: the input pin 2a, which is designed to receive the control voltage $V_{c\_in}$ indicative of the input voltage $V_{in}$; the input pin 2c, which is designed to be connected to the auxiliary winding 9 and to receive the control voltage $V_{ZCD}$, which is a function of the voltage across the auxiliary winding 9; the input pin 2d, which is designed to be connected to the second internal node $N_2$ and to receive the control voltage $V_{CS}$, which is a function of the voltage across the sensing resistor 7; and the output pin 2e, which is designed to be connected to the control terminal of the switch element 6 and to supply the driving voltage $V_{GD}$ for controlling switching of the switch element 6 in pulse-width modulation (PWM).

The control device 20 does not have, instead, a further input pin dedicated to detection of the output voltage $V_{out}$, by means of a resistive divider.

The control device 20 comprises, in this embodiment, an estimation block 22, connected to the input pin 2a, for receiving the control voltage $V_{c\_in}$ and to the input pin 2c, for receiving the control voltage $V_{ZCD}$.

The estimation block 22 is configured to estimate the value of the output voltage $V_{out}$ as a function of the input voltage $V_{in}$ and of the duty cycle D of the PFC converter 21, and for determining the value of the duty cycle D on the basis of the control voltage $V_{ZCD}$. In particular, the estimation block 22 determines the instant when the value of the control voltage $V_{ZCD}$ goes to zero in order to determine the duration of the OFF interval $T_{off}$ (reference may be made also to the foregoing description).

The estimation block 22 thus comprises a comparator (not illustrated in FIG. 2), which compares the value of the control voltage $V_{ZCD}$ with a lower threshold value, close or equal to zero. Switching of the comparator determines the instant of zero-crossing detection (ZCD) of the control voltage $V_{ZCD}$.

The control device 20 further comprises a driving block 24, which receives the estimated value $\overline{V}_{out}$ of the output voltage $V_{out}$ and generates, as a function of the estimated value $\overline{V}_{out}$ and of the control voltage $V_{CS}$, the driving voltage $V_{GD}$ for driving switching of the switch element 6 by means of a suitable control algorithm (not described in detail herein, in so far as it may be similar to known algorithms based on the output voltage detected by a resistive divider, for example being based on a peak current control).

The present Applicant has found that determination of the value of the duty cycle D on the basis of the control voltage $V_{ZCD}$ may not be accurate and consequently entail errors in the estimation of the value of the output voltage $V_{out}$, at least in some operating conditions.

As discussed previously, in fact, zero crossing by the control voltage $V_{ZCD}$ occurs in resonance condition, which is due to the inductance of the inductor 5 and to the parasitic capacitances present on the first internal node $N_1$. In particular, the presence of the parasitic components causes a negative offset in the current circulating in the inductor 5, subsequent to the same current reaching a zero value. The output capacitance of the MOSFET of the switch element 6 is initially charged at the output voltage $V_{out}$ and consequently has to be discharged with the resonant oscillation.

Consequently, whereas ideally the plot of the control voltage $V_{ZCD}$ should correspond to a square wave (being positive when the current in the inductor 5 is positive, and negative when the same current is zero), in actual fact this plot is sinusoidal.

There may consequently arise a time error, or deviation, between the instant when the sinusoidal plot of the control voltage $V_{ZCD}$ crosses zero, and the instant when an ideal square wave having the same duty cycle would cross zero.

In particular, the above time error may be defined as the difference between the instant when the control voltage $V_{ZCD}$ crosses zero (or, likewise, the voltage at the first internal node $N_1$ becomes equal to the input voltage $V_{in}$) and the instant corresponding to the falling edge of the square wave having the same mean value (in this case equal to the input voltage $V_{in}$) or, in other words, having the same area subtended by the curve.

According to a further aspect of the present solution, the estimation block 22 of the control device 20 is thus configured to determine the aforesaid time error, and thus correct the determination of the value of the duty cycle D carried out on the basis of the value of the control voltage $V_{ZCD}$. In particular, as will be described in detail hereinafter, this correction is carried out as a function of the value of the period of the resonant oscillation in the pattern of the control voltage $V_{ZCD}$.

Figure 3A:
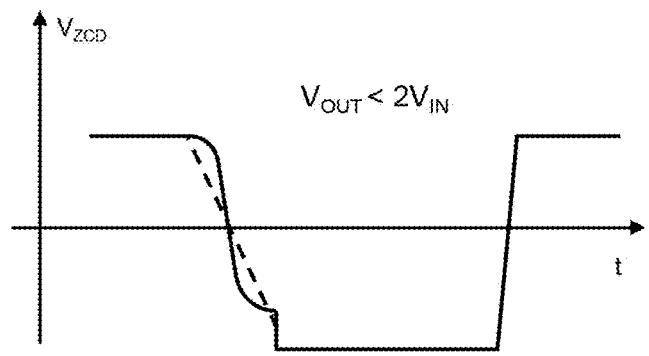
FIGS. 3A, 3B, 4A, 4B, 5A, and 5B show plots of electrical quantities associated to the PFC converter of FIG. 2, in different operating conditions.
Figure 3B:
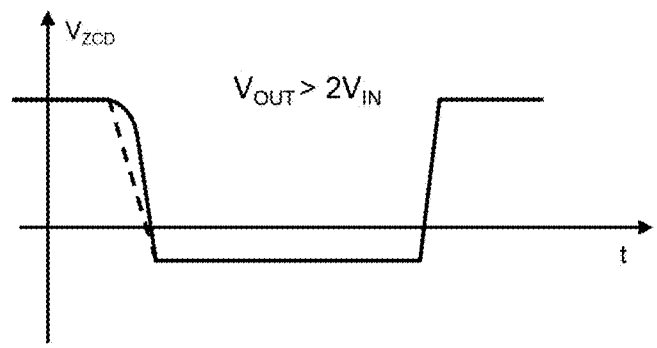

The present Applicant has further realized that the control voltage $V_{ZCD}$ has two different patterns, according to the relation between the output voltage $V_{out}$ and the input voltage $V_{in}$; namely: a first pattern, shown in FIG. 3a, in the case where the relation $V_{out} < 2 \cdot V_{in}$ applies; and a second pattern, shown in FIG. 3b, in the case where the relation $V_{out} > 2 \cdot V_{in}$ applies.

Consequently, the estimation block 22 of the control device 20 is configured to determine the aforesaid time error using: a first calculation algorithm, in the case where the relation $V_{out} < 2 \cdot V_{in}$ applies; and a second calculation algorithm, different from the first, in the case where, instead, the relation $V_{out} > 2 \cdot V_{in}$ applies.

Figure 4A:
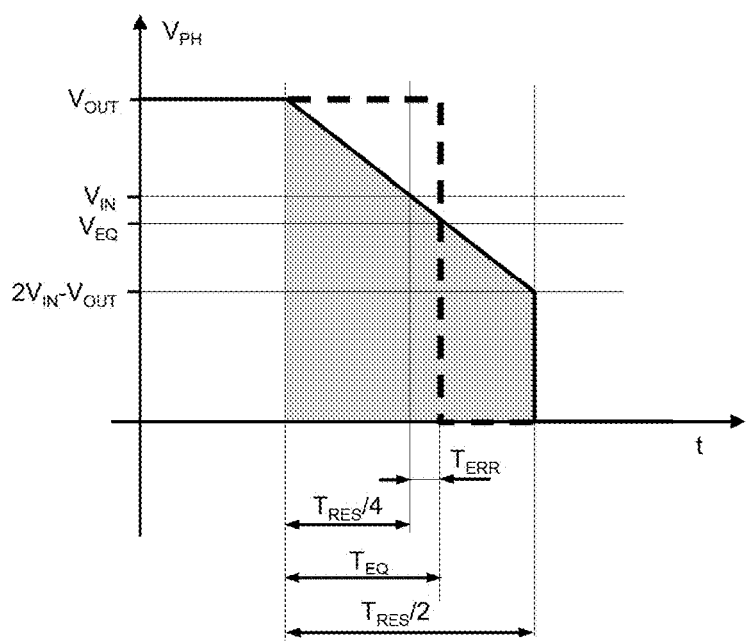

In order to describe the first calculation algorithm in detail, reference is now made to FIG. 4a, which shows the sinusoidal plot of the phase voltage $V_{ph}$ at the first internal node $N_1$, having a pattern corresponding to the control voltage $V_{ZCD}$.

The phase voltage $V_{ph}$ is substantially equal to the output voltage $V_{out}$ when the switch element 6 is off, and is substantially equal to zero (ground) when the switch element 6 is on. Furthermore, at the transition between the OFF state and the ON state of the switch element 6, the output voltage $V_{out}$ itself has a sinusoidal pattern with a mean value equal to the input voltage $V_{in}$ and oscillation period $T_{res}$, and with an amplitude comprised between the output voltage $V_{out}$ and a value given by the expression $2 \cdot V_{in} - V_{out}$.

This sinusoidal pattern is schematically approximated with a linear segment in FIG. 4a, which further shows (with a dashed line) the ideal square wave comprised between the output voltage $V_{out}$ and zero and having the same mean value, which is equal to the input voltage $V_{in}$ (and the same subtended area as that of the curve that defines the plot of the phase voltage $V_{ph}$). In particular, the ideal square wave assumes the mean value $V_{in}$ at an equivalent time $T_{eq}$, which thus represents the ideal ZCD instant.

From an examination of the aforesaid FIG. 4a, with geometrical considerations, it is possible to obtain the following relation $$V_{out} \cdot T_{eq} = V_{in} \cdot \frac{T_{res}}{2}$$

which further corresponds to the condition of equality between the mean value of the ideal square wave and the mean value of the phase voltage $V_{ph}$.

From the aforesaid expression, it is possible to obtain:

$$T_{eq} = \frac{V_{in}}{V_{out}} \cdot \frac{T_{res}}{2}$$

Consequently, the time error $T_{err}$ on determination of the ZCD instant, due to the resonance condition, is given by:

$$T_{err} = T_{eq} - \frac{T_{res}}{4} = \frac{2 \cdot V_{in} - V_{out}}{V_{out}} \cdot \frac{T_{res}}{4}$$

From the above expression, the estimation block 22 of the control device 20 is thus able to determine the time error $T_{err}$ as a function of the value of the input voltage $V_{in}$, of the value of the oscillation period $T_{res}$, and of the desired value of the output voltage $V_{out}$ (for example, 400 V).

According to a further aspect of the present solution, the control device 20 is able to determine the oscillation period $T_{res}$, which is assumed substantially constant, monitoring the plot of the control voltage $V_{ZCD}$ in the case where the resonant oscillation is left free and is not interrupted (i.e., by not closing the switch element 6 following upon detection of the ZCD instant).

In particular, determination of the oscillation period $T_{res}$ may advantageously be carried out in an initial condition of start-up or initialization of the PFC converter 21, or else be carried out in real time, during its operation, in this case dedicating a pre-set number of switching cycles for this purpose (switching cycles in which power will thus not be transferred to the load).

Furthermore, advantageously, the control device 20 may update the value of the oscillation period $T_{res}$ at pre-set time intervals in order to prevent drifts or variations of the same value due, for example, to degradation or aging of the components or to changes in the environmental operating conditions (in the case of prolonged periods of activity of the PFC converter 21).

Figure 5A:
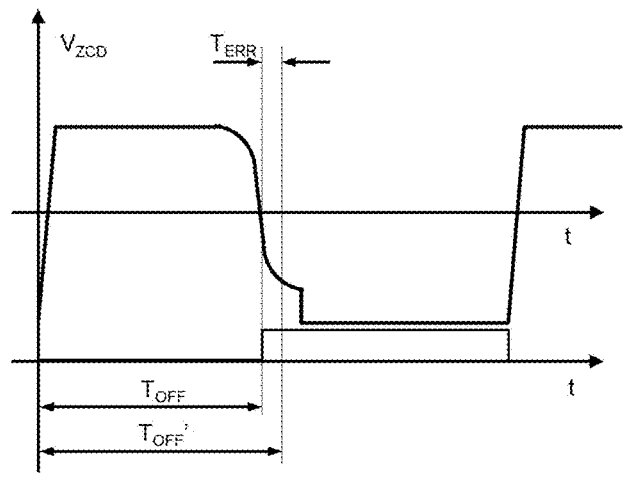

In any case, once the time error $T_{err}$ has been determined, the estimation block 22 of the control device 20 is able to carry out a correction of the value of the OFF interval $T_{off}$ determined as a function of detection of the ZCD instant, as shown in FIG. 5a (which illustrates the plot of the control voltage $V_{ZCD}$), on the basis of the following expression:

$$T_{off}'=T_{off}+T_{err}$$

Then, the same estimation block 22 estimates the value of the output voltage $V_{out}$, by the following expression, as a function of the corrected value $T_{off}'$ of the OFF interval $T_{off}$:

$$\overline{V}_{out} = V_{in} \cdot \frac{T}{T_{off}'}$$

where T is the switching period, and $\overline{V}_{out}$ is the aforesaid estimated value of the output voltage $V_{out}$.

It may further be shown that the following expression applies:

$$\overline{V}_{out} = 2 \cdot V_{in} \cdot \frac{2 \cdot T - T_{res}}{4 \cdot T_{off} - T_{res}}$$

which links directly the estimated value $\overline{V}_{out}$ of the output voltage $V_{out}$ to the input voltage $V_{in}$, to the oscillation period $T_{res}$, and to the OFF interval $T_{off}$.

Figure 4B:
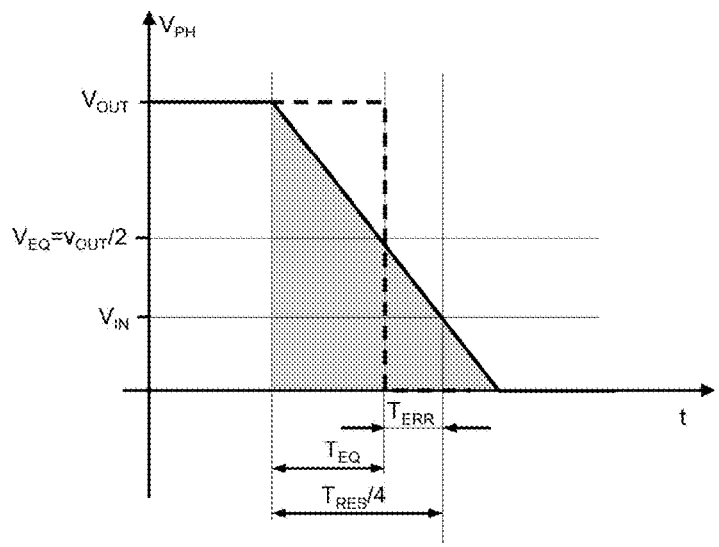

The second calculation algorithm is now described, with reference to FIG. 4b, used in the case where the relation $V_{out} > 2 \cdot V_{in}$ applies.

In this case, upon transition between the OFF state and the ON state of the switch element 6, the phase voltage $V_{ph}$ has a sinusoidal plot, once again approximated with a linear segment, with a mean value equal to $V_{out}/2$.

FIG. 4b further shows the ideal square wave, which is comprised between the output voltage $V_{out}$ and zero and has the same mean value.

In a way similar to what has been discussed previously, it is possible to obtain the expression for the equivalent time $T_{eq}$:

$$T_{eq} = \frac{V_{out}}{2} \cdot \frac{T_{res}}{4} \cdot \frac{1}{V_{in} - V_{out}}$$

The time error $T_{err}$ on the determination of the ZCD instant, due to resonance, is given in this case by the following expression:

$$T_{err} = \frac{T_{res}}{4} - T_{eq} = \frac{V_{in} - \frac{V_{out}}{2}}{V_{in} - V_{out}} \cdot \frac{T_{res}}{4}$$

From this expression, the estimation block 22 of the control device 20 is able to determine the time error $T_{err}$, as a function of the value of the input voltage $V_{in}$, of the value of the oscillation period $T_{res}$, and of the desired value of the output voltage $V_{out}$.

Figure 5B:
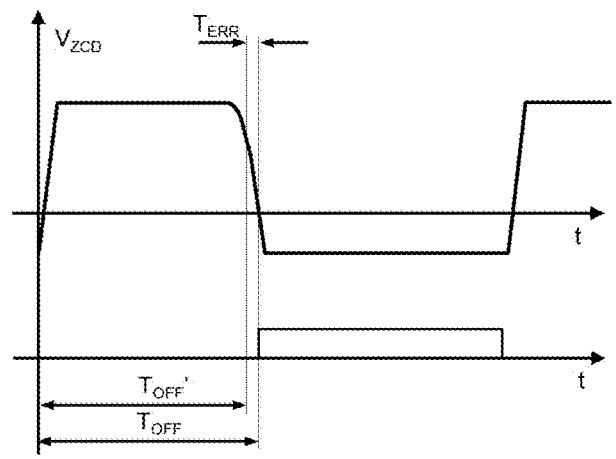

Once the time error $T_{err}$ is obtained, the estimation block 22 carries out a correction of the value of the OFF interval $T_{off}$ determined as a function of detection of the ZCD instant, as shown in FIG. 5b, on the basis of the following expression:

$$T_{off}'=T_{off}-T_{err}$$

Then, the same estimation block 22 estimates the value of the output voltage $V_{out}$, by means of the following expression, as a function of the corrected value $T_{off}'$ of the OFF interval $T_{off}$:

$$\overline{V}_{out} = V_{in} \cdot \frac{T}{T_{off}'}$$

It may further be shown that the following expression applies:

$$\overline{V}_{out} = V_{in} \cdot \frac{T_{res} - 4T - 4T_{off} - \sqrt{\begin{array}{c}16T^2 - 32T \cdot T_{off} + T_{res}^2 - \\ 8T_{off} \cdot T_{res} + 16T_{off}^2\end{array}}}{T_{res} - 8T_{off}}$$

This expression links the estimated value $\overline{V}_{out}$ of the output voltage $V_{out}$ directly to the input voltage $V_{in}$, to the oscillation period $T_{res}$, and to the OFF interval $T_{off}$.

The present Applicant has verified, with experimental tests, the extent of the time error $T_{err}$ and the consequent increase in precision afforded by the present solution.

For example, considering an input voltage $V_{in}$ of 230 $V_{AC}$ (325 $V_{DC}$), a desired output voltage $V_{out}$ of 400 V, a switching period of 14.20 µs (frequency of 70 kHz) and an oscillation period $T_{res}$ determined as being equal to 1 µs: the value of duty cycle D is 0.1875; the ON interval $T_{on}$ (determined on the basis of the ZCD instant) is 2.66 µs; and the corrected value $T_{on}'$ is 2.5 µs, with a resulting error of 5.8% (which may be corrected thanks to the present solution).

As a further example, considering an input voltage $V_{in}$ of 265 $V_{AC}$ (375 $V_{DC}$), a desired output voltage $V_{out}$ of 400 V, a switching period of 14.20 µs (frequency of 70 kHz), and an oscillation period $T_{res}$ of 1 µs: the value of duty cycle D is in this case 0.0625; the ON interval $T_{on}$ is 887.5 ns; the corrected value $T_{on}'$ is 668.75 ns, with a resulting error of 24.6% (which may be corrected thanks to the present solution).

Figure 6:
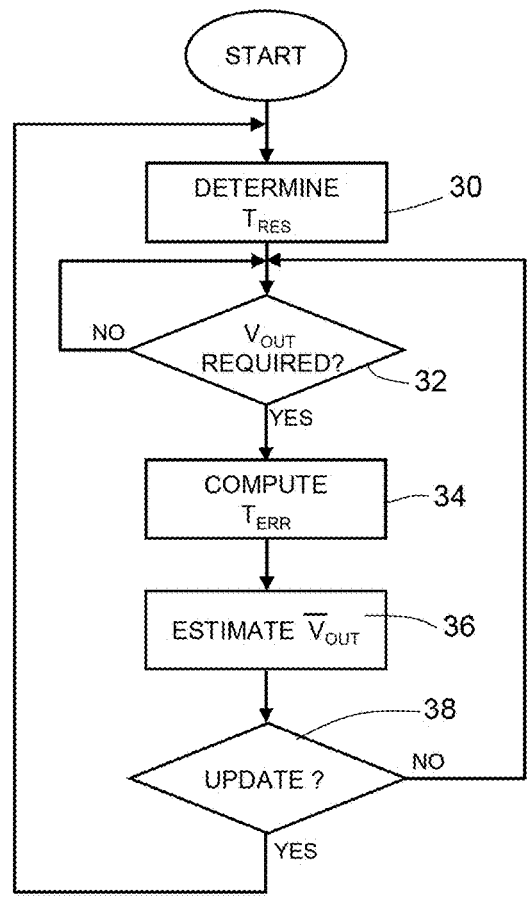
FIG. 6 is a flowchart of control operations performed by the control device of the PFC converter of FIG. 2.

A schematic summary of the flow of the operations performed by the control device 20 for estimation of the output voltage $V_{out}$ is now presented, with reference to the flowchart of FIG. 6.

In an initialization step, designated by 30, the control device 20 controls the switch element 6 so as to force the resonance condition and stimulate the oscillation on the control voltage $V_{ZCD}$. In particular, one or more pulses are applied to the gate terminal of the MOSFET of the switch element 6 to cause resonance, after which the switch element 6 is not switched on again at the ZCD instant for not dampening the oscillation and thus measure the oscillation period $T_{res}$ by analyzing the control voltage $V_{ZCD}$ (precisely, in a condition of free oscillation).

In particular, this operation may be carried out at start-up of the PFC converter 21, or else during operation of the same PFC converter 21, in which case some switching cycles will be assigned to the operation of determination of the value of the oscillation period $T_{res}$, instead of being dedicated to the transfer of power to the load.

The value of the oscillation period $T_{res}$ is then considered substantially constant (but for periodic updatings, as described hereinafter).

During normal operation of the PFC converter 21, whenever the control device 20 is required to supply the value of the output voltage $V_{out}$ for the purposes of the control operations (a control that may be carried out using any known technique), as represented schematically in step 32, the estimation block 22 determines the estimated value $\overline{V}_{out}$ of the output voltage $V_{out}$, on the basis of the expressions discussed previously.

In particular, the estimation block 22 applies an appropriate correction to the value of the ZCD instant determined on the basis of the control voltage $V_{ZCD}$ (step 34), and accordingly determines a corrected value of the duty cycle D, after which it carries out estimation of the value of the output voltage $V_{out}$ on the basis of the expression that links the input voltage to the output voltage $V_{out}$ itself (of a known type and depending on the circuit type of the PFC converter 21) (step 36).

For the purposes of the aforesaid operations, the estimation block 22 makes a preliminary check based on the value of the input voltage $V_{in}$ and of the output voltage $V_{out}$ for implementing the first algorithm or second algorithm of calculation of the time error $T_{err}$ in step 34.

For example, the operations of estimation of the value of the output voltage $V_{out}$ may be carried out at each switching cycle or half-cycle of the PFC converter 21.

Furthermore, according to a further aspect of the present solution, the control device 20 is configured (step 38) for determining the need to carry out an operation of updating of the value of the oscillation period $T_{res}$, for example once a pre-set time interval has elapsed from a last updating, or in the case where the control device 20 verifies the presence of given environmental conditions or given operating parameters.

In this case, the operations return to step 30, for a new determination of the value of the oscillation period $T_{res}$, in a way substantially similar to what has been described previously, and then to the usual control operations of the PFC converter 21.

Figure 7:
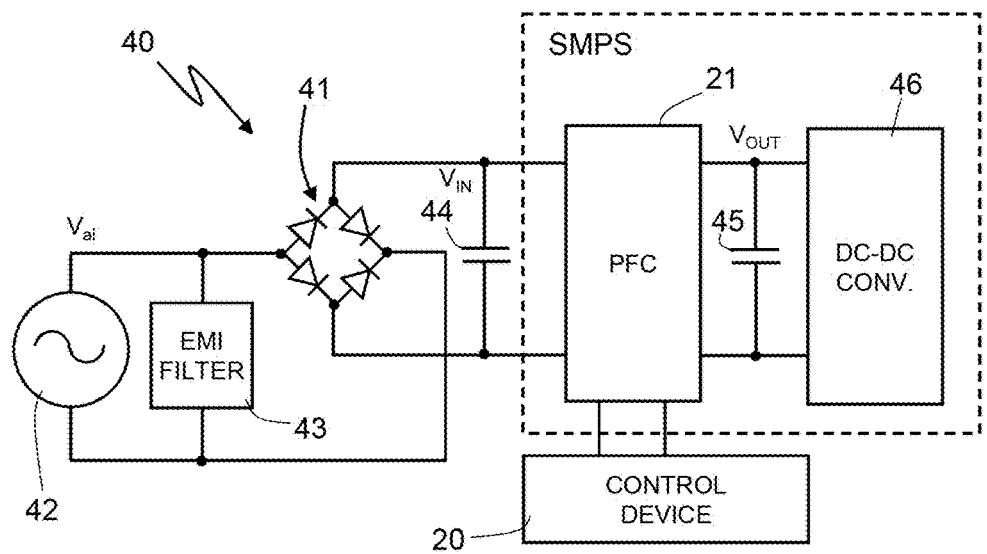
FIG. 7 shows a simplified block diagram of a switched-mode power supply including the PFC converter of FIG. 2.

As indicated previously, the PFC converter 21 and the corresponding control device 20 may advantageously be used in a switched-mode power supply 40, as illustrated in FIG. 7.

In particular, the switched-mode power supply 40 comprises a rectifier stage 41 (for example, of the diode-bridge type), connected to the electrical mains supply 42, in the example through an EMI filter 43, and a capacitive input element 44, connected to the output of the rectifier stage 41, on which the input voltage $V_{in}$ is present.

The switched-mode power supply 40 further comprises the PFC converter 21, having its input terminal IN connected to the capacitive input element 44 and its output terminal OUT connected to a capacitive output element 45 (coinciding with the charge-storage element 4, defined previously).

The control device 20 controls operation of the PFC converter 21 for ensuring a desired power factor during absorption from the electrical mains supply 42.

The switched-mode power supply 40 further comprises an output power converter 46, in this example of a DC/DC type, which has its input connected to the capacitive output element 45 and is designed to supply to a load (not illustrated) a desired output voltage, for example with a value appropriately reduced with respect to the value of the output voltage $V_{out}$.

The advantages of the solution proposed are clear from the foregoing description.

In any case, it is emphasized that this solution enables, amongst other features, a drastic reduction of the power consumption required by the converter, thanks to the absence of a resistive divider dedicated to detection of the output voltage $V_{out}$.

Furthermore, the control device 20 may advantageously have a lower number of pins (given that a pin dedicated to detection of the aforesaid output voltage $V_{out}$ is not necessary), with a consequent reduced occupation of area and simplification of the package.

The above advantages are further afforded without any appreciable reduction in the control performance, thanks to the accurate technique of estimation of the output voltage $V_{out}$ implemented by the control device 20.

Finally, it is clear that modifications and variations may be made to what has been described and illustrated herein, without thereby departing from the scope of the present disclosure.

In particular, it is once again pointed out that, even though the foregoing description has made explicit reference to a boost-type converter, the present solution may advantageously be applied also to other types of converters, for example of the flyback type or buck-boost type and corresponding variants (with obvious modifications, in particular in the expression of the output voltage $V_{out}$ as a function of the input voltage $V_{in}$ and of the duty cycle D, and in the expressions used for determination of the time error $T_{err}$).

The control device and method described may be used for control of any power converter, not only for applications of power factor control, to which explicit reference has been made in the foregoing description.

It is also clear that the converter could be supplied also by a supply source different from the electrical mains supply.

Finally, it is emphasized that the converter according to the present solution may advantageously provide a voltage regulator or converter, to which the foregoing treatment has made explicit reference, by way of non-limiting example, or a current regulator or converter (for example, in driver devices for LEDs or in battery chargers).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device configured to control switching circuitry of a power converter, the switching circuitry including an inductive element, a switching element, and a phase node defined at an interconnection of the inductive and switching elements, the control device being configured to generate a driving signal to control the switching element to generate an output quantity, wherein the control device is configured to generate a driving signal based on a value of the output quantity and to estimate a value of the output quantity based on a value of an input quantity and a duty cycle of the switching element, wherein the control device is further configured to determine the duty cycle based on a zero-current condition of the inductive element and on a corrective factor that is based on a resonance condition of a voltage on the phase node.

2. The control device of claim 1, wherein the control device is further configured to generate a control signal indicating the zero-current condition of the inductive element.

3. The control device of claim 2, wherein in the resonance condition the control signal has a sinusoidal pattern and wherein the switching circuitry comprises an estimation block configured to determine the corrective factor based on a time difference between a time at which the control signal equals zero and a time at which an ideal square wave having a same mean value as the control signal would equal zero.

4. The control device of claim 3, wherein the switching circuitry further comprises an auxiliary winding magnetically coupled to the inductive element and configured to generate the control signal.

5. The control device of claim 4, wherein the estimation block is further configured to determine the corrective factor based on whether the output quantity is less than two times the input quantity and whether the output quantity is greater than or equal to two times the input quantity.

6. The control device of claim 5, wherein the estimation block is further configured to determine the corrective factor as a function of an oscillation period associated with the resonance condition.

7. The control device according to claim 6, wherein the power converter is configured to operate in a start-up phase and wherein the estimation block is configured to determine a value of the oscillation period in the start-up phase.

8. The control device of claim 7, wherein the estimation block is further configured to update the determined value determined of the oscillation period during operation of the power converter.

9. The control device of claim 8, wherein the power converter is one of a boost, flyback and buck-boost type power converter.

10. The control device of claim 9, wherein the power converter is a power-factor-correction power converter.

11. A switched-mode power supply, comprising:
a power converter including switching circuitry including an inductive element, a switching element, and a phase node formed at an interconnection of the inductive and switching elements, the switching circuitry coupled to receive an input voltage and configured to generate an output voltage based upon a driving signal;
a control device coupled to the switching circuitry and configured to generate the driving signal to control the switching element to generate the output voltage, the driving signal being based on a value of the output voltage and the control device configured to estimate a value of the output voltage based on a value of the input voltage and a duty cycle of the switching element, the duty cycle being based on a zero-current condition of the inductive element and on a corrective factor that is based on a resonance condition of a voltage on the phase node; and
an output power converter coupled to the power converter to receive the output voltage.

12. The switched-mode power supply of claim 11, wherein the output power converter comprises a DC-DC power converter.

13. The switched-mode power supply of claim 12, wherein the switching element comprises a MOSFET and the inductive element comprises a transformer.

14. The switched-mode power supply of claim 13 further comprising:
an integrated circuit containing the control device; and
a printed circuit board, the integrated circuit and power converter being mounted to the printed circuit board and electrically interconnected through the circuit board.

15. The switched-mode power supply of claim 14, wherein in the resonance condition the control signal has a sinusoidal pattern and wherein the switching circuitry comprises an estimation block configured to determine the corrective factor based on a time difference between a time at which the control signal equals zero and a time at which an ideal square wave having a same mean value as the control signal would equal zero.

16. A method of controlling a power converter, the method comprising:
determining a value of an input voltage supplied to switching circuitry of the power converter, the switching circuitry including a switching element, an inductive element, and a phase node defined at an interconnection of the switching and inductive elements;
determining a duty cycle of the switching element based on a zero-current condition of the inductive element and on a corrective factor that is based on a resonance condition of a voltage on the phase node;
estimating a value of the output voltage based on a value of the input voltage and the duty cycle; and
generating a driving signal to control the duty cycle of the switching element, the driving signal being based on the estimated value of the output voltage.

17. The method of claim 16 further comprising generating a control signal indicating the zero-current condition of the inductive element.

18. The method of claim 17, wherein determining the duty cycle comprises determining the corrective factor based on a time difference between a time at which the control signal equals zero and a time at which an ideal square wave having a same mean value as the control signal would equal zero.

19. The method of claim 18, wherein determining the corrective factor further comprises determining the corrective factor based on an oscillation period of the voltage on the phase node that is associated with the resonance condition.

20. The method of claim 19, wherein determining the corrective factor based on the oscillation period further comprises updating the determined value of the oscillation period during operation of the power converter.

* * * * *